Figure 6:
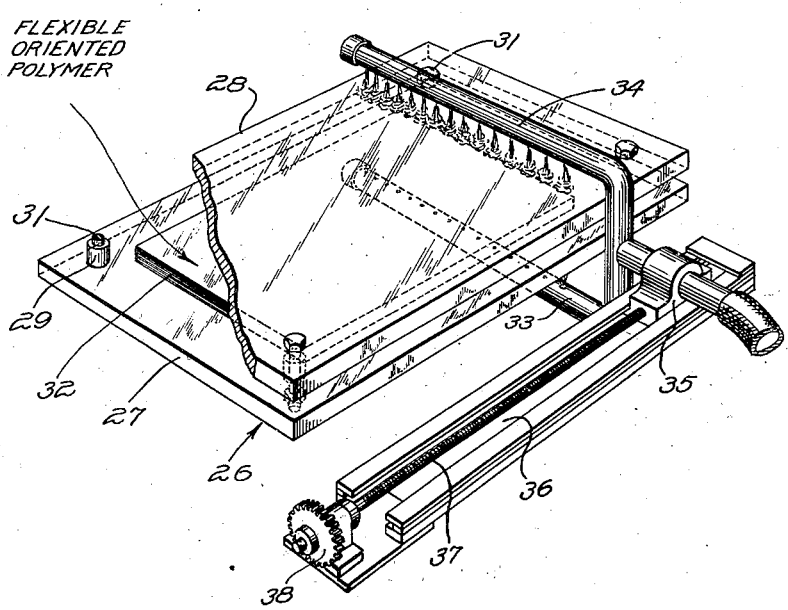

Oct. 21, 1947.  J. BAILEY  2,429,340
METHOD OF MAKING RIGID INTEGRAL SHAPES OF ORIENTED POLYMER
Filed Nov. 23, 1943  2 Sheets-Sheet 1
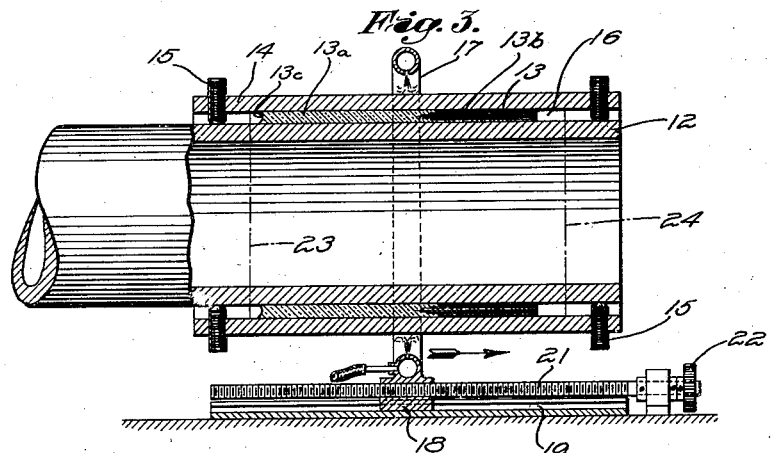
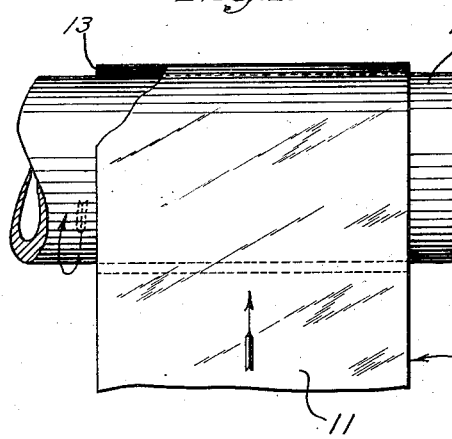
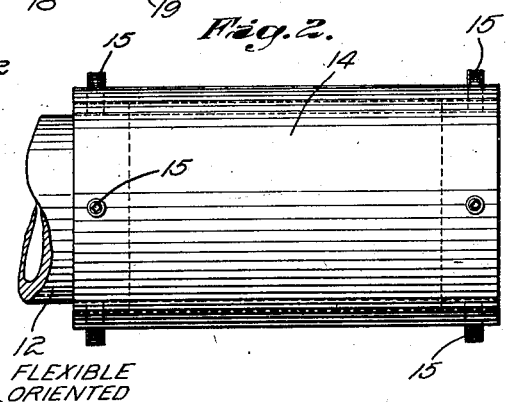
FLEXIBLE ORIENTED POLYMER
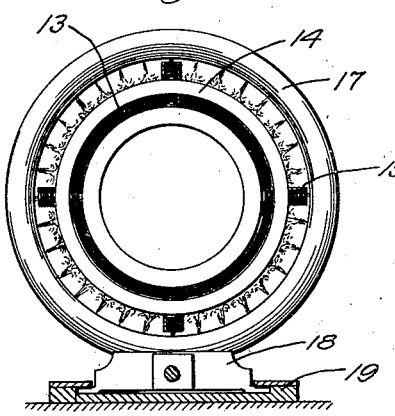
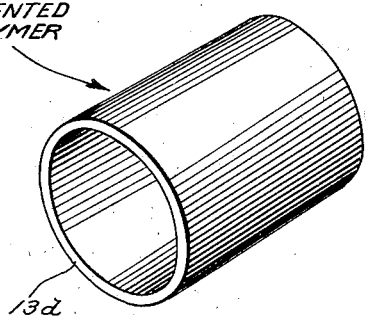
RIGID INTEGRAL CYLINDER OF ORIENTED POLYMER
Witness
W. B. Thayer
Inventor
James Bailey
by Brown Parham
Attorneys Oct. 21, 1947.   J. BAILEY   2,429,340
METHOD OF MAKING RIGID INTEGRAL SHAPES OF ORIENTED POLYMER
Filed Nov. 23, 1943   2 Sheets-Sheet 2

FLEXIBLE ORIENTED POLYMER

RIGID INTEGRAL SLAB OF ORIENTED POLYMER

Inventor
James Bailey
by Brown & Parham
Attorneys

Witness
W. B. Thayer

Patented Oct. 21, 1947

2,429,340

UNITED STATES PATENT OFFICE 2,429,340

METHOD OF MAKING RIGID INTEGRAL SHAPES OF ORIENTED POLYMER

James Bailey, West Hartford, Conn., assignor to Plax Corporation, Hartford, Conn., a corporation of Delaware Application November 23, 1943, Serial No. 511,490

6 Claims. (Cl. 18—48)

This invention relates to a method of molding rigid integral shapes of oriented resin polymer. It has particular relation to the making of rigid shapes, such as slabs, cylinders or other articles of relatively high strength formed from certain resin polymers which form brittle and hence relatively weak rigid shapes when molded by the usual injection or compression methods. The resin polymers referred to are of the type which are capable of molecular orientation, such as vinyl polymers, of which polystyrene is an example.

Such resin polymers have certain valuable properties which make their use desirable and therefore if their inherent brittleness or weakness is overcome, the use of the polymers can be substantially increased.

It is known that the tensile strength and toughness of such polymers may be substantially increased by molecular orientation of thin sections such as fibers and foils. Thus, polystyrene, though forming a brittle foil or sheet when formed by ordinary methods, may be toughened and made flexible by molecular orientation. One method of doing this is to extrude the polymer in the form of a sheet or ribbon and then stretching it in both transverse and longitudinal directions under selected temperature and other conditions to effect biaxial orientation. The area of the sheet is increased and its thickness reduced. The method of forming such sheet is not per se part of the present invention.

However, it is not feasible in most cases to strengthen or toughen relatively thick and rigid shapes or articles of unusual shape or size by any such method of molecular orientation because of the difficulty of establishing and controlling the necessary conditions and of stretching such articles to the required degree. Therefore, such articles usually have had to be formed by heating molding powder until soft and flowable and forming it in a mold or die with the result that the articles have the inherent brittleness and possibly other defects of the resin polymer which may cause them to crack or break in service.

I have discovered that rigid, integral shapes of oriented polymer may be produced in various forms from inherently brittle or weak resin polymer by forming the articles from flexible sheet or foils of such polymer which sheet or foils have been molecularly oriented. This is accomplished by coalescing such sheet or foils by heat into a solid, continuous or integral and non-lamellar mass of the desired shape in which the identity of the sheet or foils is lost or nearly lost but under controlled conditions such that a substantial amount of the molecular orientation thereof is retained in the shape. Therefore, the shape is, itself, formed of oriented resin polymer and is much tougher and stronger than similar articles heretofore produced. The impact strength of a shape produced by this discovery or invention may be up to 30 or 50% or more than the impact strength of the same shape produced by ordinary molding methods starting with molding powder and heating it to relatively high temperature.

Because of the fact that the shapes produced by this invention or discovery contain a substantial amount of molecular orientation, they are unstable to heat, that is, if heated to a temperature and under conditions such that the orientation can be relaxed, they will be deformed by the tendency of resin polymer to resume its shape and dimensions before orientation thereof.

Figure 7:
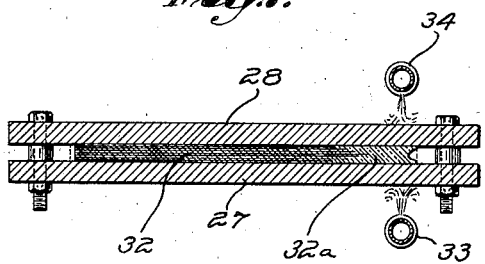
Figure 8:
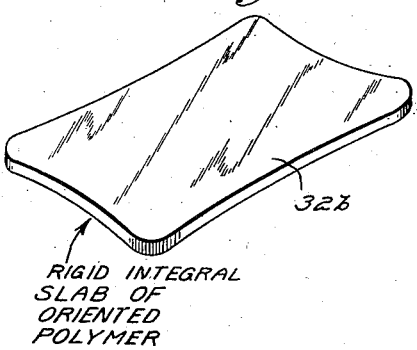

The discovery or invention will now be described in further detail by reference to the accompanying drawings in which two embodiments are depicted by way of example and in which drawings:

Figs. 1 to 5 inclusive show some of the steps in forming a rigid integral cylinder of oriented polymer from molecularly oriented sheet or foil of such polymer, Fig. 5 showing such a cylinder; and Figs. 6 and 7 show steps in forming a rigid integral slab of oriented polymer from molecularly oriented sheet or foil of such polymer, Fig. 8 showing such a slab.

It will be understood that variations and changes may be made in the illustrated embodiments as to the types or shapes of articles produced and as to the manner in which the method is performed, without departing from the scope of the appended claims.

The discovery or invention will be described in its application to the production of shapes of polystyrene, an inherently brittle resin polymer having valuable properties, such as low power factor, which make it especially useful in electronics. Other resin polymers capable of being molecularly oriented may be employed.

The polystyrene is employed in the form of flexible sheet or foil which has been molecularly oriented, preferably transversely and longitudinally and hence biaxially, as by increasing its area by a factor of twelve by transverse and longitudinal stretching. Such sheet or foil is shown at 11, Fig. 1, being wound on a mandrel 12. Though not so shown, the mandrel may be, and preferably is, of the well-known collapsible type to permit it to be easily removed from the inside of the cylinder to be formed. Removal of the cylinder may be aided by soaping or otherwise lubricating the mandrel before the sheet or foil is wound on it. A tight winding should be made. The winding is shown at 13. The layers need not be continuous and need not be applied spirally but a continuous, spiral winding is preferred.

The winding 13 may be held in place on the mandrel 12 by various means. In Fig. 3 an outer confining wall is provided by a cylinder 14 which is slipped over the winding 13 and may be secured concentrically of and upon mandrel 12 by set screws 15 threaded through the ends of the cylinder. This provides an annular mold cavity 16.

The winding is now heated as by means of an annular gas burner 17 surrounding the mold cylinder 14 and carried by slide 18 in guide 19. A shaft 21 is threaded through slide 18 so that by turning the shaft, as by means (not shown) having driving connection with pinion 22, the burner may be moved axially of the mold assembly.

Heat preferably is applied in zones progressively from one end of the mandrel to the other. Thus, in Fig. 3, heat may first be applied in a zone at the left-hand end of winding 13 by burner 17. This causes the layers of the winding in the heating zone to soften and to contract lengthwise and crosswise where not restrained by the cooler portions of the layers. As contraction occurs, the layers increase in thickness until further thickening is prevented by the confining surfaces of mandrel 12 and cylinder 14. The application of heat and the tension and pressure developed by the resulting partial relaxation of molecular orientation causes the layers of the polymer to coalesce into an integral, non-lamellar mass. When further thickening is prevented, contraction is stopped in the heating zone and the pressure against the confining surfaces holds the layers firmly in position in the cavity 16 although further contraction can still occur in the unheated portion of the winding.

The layers may slip on the confining surfaces and on one another until they become stuck together and further thickening is prevented by radial pressure. Therefore, the amount of contraction of different layers may vary. Pressure up to 100 or 150 lbs. per square inch may be developed between the confining surfaces by the relaxation of the polymer.

The amount of contraction and increase in thickness can be controlled by predetermining the tightness of the layers in the mold cavity. The more tightly the mold cavity is packed the less the contraction and increase in thickness and the greater the amount of molecular orientation remaining in the cylinder which is formed. This is due to the fact that less expansion and hence less contraction is necessary to cause the layers to coalesce.

The entire winding now is heated progressively either by a continuous or a step-by-step axial movement of burner 17 in the direction of the arrow, Fig. 3. As this is done, the cooler portion of the winding contracts toward the heated portion and thickening and coalescing of the winding occurs progressively to form the cylinder in an integral non-lamellar mass of molecularly oriented polymer.

Fig. 3 shows burner 17 about midway in its axial travel and slightly more than half of the winding 13 coalesced at 13a and less than half thereof at 13b remaining to be heated and coalesced. Lengthwise contraction of the winding is illustrated by the dot and dash lines 23 and 24, Fig. 3, which indicate where the ends of the winding 13 were on the mandrel before heating began. It will be noted that contraction is greater at the cooler end of the winding than the initially heated end. Contraction also may be greater in the inner layers than the outer layers as indicated at 13c.

The trapped air between the layers is squeezed out and escapes through the cooler portion of the winding. Even bubbles in the sheet or foil are eliminated.

The completed cylinder or tube is shown at 13d, Fig. 5. The ends or other uneven surfaces may be trimmed or cut off.

In some cases, the mold cylinder 14 may be omitted and the winding held in place by other suitable means as by a layer of string. This permits forming integral tubes or cylinders because the contraction of the winding causes tight packing of the layers. However, an outside retainer, such as cylinder 14, is preferred to limit the increase in outside diameter and to prevent excessive longitudinal contraction as well as to insure even wall thickness where that is desirable.

The heat preferably is so applied and controlled as to form the integral, non-lamellar shape with the minimum of relaxation of molecular orientation, in order to retain the maximum amount of orientation in the final shape. The time of heating varies inversely as the temperature, a low temperature requiring a relatively long heating period and a high temperature a relatively short period.

The heating temperature must be above the transition temperature of the particular polymer but should not lie so close to the transition temperature as to require an inordinate amount of time for the necessary partial relaxation to occur nor so high above the transition temperature that relaxation takes place too fast.

The transition temperature of polystyrene is 180° F. and a suitable heating range is 220 to 280° F. The transition temperature of the polymer may be determined by the method disclosed in "Transition Temperature and Cubical Expansion of Plastic Materials" by Fred E. Wiley, Industrial and Engineering Chemistry, vol. 34, page 1052, September 1942. The term "transition temperature" is used herein in the sense that it is used and described in the publication referred to.

In heating the winding of Figs. 3 and 4, the entire mold and winding may first be heated throughout to 184° F. and then the winding may be heated rapidly in each zone to 260° F. plus or minus 20° F. until shrinkage in the zone has nearly stopped, then repeating in the next zone, and so on.

In forming other shapes a similar procedure may be followed. Thus, in forming a rigid slab a mold 26, Fig. 6, may be provided by plates 27 and 28, spaced apart by collars 29 on bolts 31 to receive a stack of sheets or foils 32 of flexible oriented polymer. The sheets may be heated by burners 33 and 34 on slide 35 in guide 36 reciprocated by shaft 37 screw threaded through the slide and rotated by pinion 38.

As shown in Fig. 7, the sheets or foils may be heated and coalesced initially at 32a and the heating continued progressively to completely unify the sheets into a rigid, integral, non-lamellar slab of oriented resin polymer as shown at 32b; Fig. 8. Lateral and longitudinal contraction may be such as to cause the sides and ends of the slab to be curved inwardly as shown.

Raised surfaces or recesses may be formed in the articles by suitably shaping the molds and increasing or decreasing the number of layers as may be required to form such raised surfaces or recesses to the desired thickness.

From the foregoing it will be seen that rigid, integral, non-lamellar shapes of oriented resin polymer may be formed of substantially greater strength than can be formed by ordinary molding methods which result in articles having the inherent brittleness and low strength of the resin-polymer. Such shapes may be distinguished from similar shapes of the prior art by tests which reveal the relatively high strength or toughness of the novel products and the arrangement of molecular orientation which generally corresponds to that of the assembled sheet or foil from which the novel article is formed. They may also be distinguished by marks or edges which may remain as the result of uneven contraction of the layers or incomplete overlapping of an outer layer with respect to an inner layer. However, in every case, the internal structure is non-lamellar.

It will be understood that the strength in my novel shapes or articles is directional, that is, the direction of strength corresponds to the direction of molecular orientation of the sheet or foil from which the shape is made, the article being relatively weak in other directions.

Having thus described my invention, what I claim is:

1. The process of forming a rigid, integral and non-lamellar shape of molecularly oriented polymer which comprises assembling layers of molecularly oriented sheet of said polymer on a rigid mold member in approximately the form of the shape desired, heating the assembled layers to a temperature within the softening range of said polymer to cause contraction and thickening thereof, restraining the thickening of said layers on said mold member whereby relaxation forces cause coalescing of the layers into a non-lamellar mass and said forces impart the shape of the mold member to said mass, and so controlling the heating of the layers that the amount of contraction and thickening which takes place is substantially less than the potential maximum contraction and thickening of said layers.

2. The process of forming a rigid, integral and non-lamellar shape of molecularly oriented polymer which comprises assembling layers of molecularly oriented sheet of said polymer on a rigid mold member, effecting a partial relaxation only of the molecular orientation of said layers while restraining the relaxation forces by heating the assembled layers to a temperature within the softening range of said polymer until said layers are coalesced by said relaxation forces into a non-lamellar structure of molecularly oriented polymer and to which is imparted the shape of said mold member.

3. The process of forming a rigid integral and non-lamellar shape of molecularly oriented polymer which comprises assembling layers of molecularly oriented sheet of said polymer in approximately the form of the shape desired, softening and effecting partial relaxation only of said layers by applying heat thereto whereby relaxation forces cause the layers to coalesce into an integral, non-lamellar mass, and holding said layers between confining surfaces to restrain said relaxation forces during the said heating thereof whereby the shape of the space between said surfaces is imparted to the mass by said relaxation forces.

4. The process of forming a rigid integral and non-lamellar shape of molecularly oriented polymer which comprises winding a molecularly oriented sheet of said polymer in layers on a form and holding it thereon, the molecular orientation forces in said sheet being relaxable by the application of heat thereto with accompanying linear contraction and increase in thickness, softening and effecting partial relaxation only of the molecular orientation forces in said layers by applying heat thereto, and restraining said relaxation to cause said layers to coalesce into an integral, non-lamellar mass under pressure resulting from said restrained relaxation.

5. The process of forming an inflexible integral, non-lamellar shape of molecularly oriented polystyrene which comprises assembling and holding on a rigid mold member layers of molecularly oriented polystyrene sheet in approximately the form of the shape desired, the molecular orientation forces in said sheet being relaxable by the application of heat thereto with accompanying linear contraction and increase in thickness, effecting partial relaxation of the molecular orientation forces in said layers by heating said layers, and restraining said relaxation whereby said layers are coalesced into an integral, non-lamellar mass of molecularly oriented polystyrene under pressure resulting from restraining said relaxation.

6. The process of forming an inflexible, integral, non-lamellar shape of molecularly oriented polymer which comprises assembling and holding on a restraining mold member layers of molecularly oriented sheet of said polymer, the molecular orientation forces in said sheet being relaxable by the application of heat thereto with accompanying linear contraction and increase in thickness, softening and effecting partial relaxation only of the molecular orientation forces in said layers by applying heat to the assembly of layers progressively from one end to the other thereof, and restraining the relaxation to cause said layers progressively to coalesce into an integral, non-lamellar mass under pressure resulting from said relaxation and said restraint.

JAMES BAILEY.

REFERENCES CITED

The following references are of record in the file of this patent:

UNITED STATES PATENTS

| Number | Name | Date |
|---|---|---|
| 2,259,347 | Mallory | Oct. 14, 1941 |
| 2,328,827 | Martin | Sept. 7, 1943 |
| 1,962,683 | Dreyfus | June 12, 1934 |
| 2,067,025 | Schmidt | Jan. 5, 1937 |
| 1,808,998 | Sheppard et al. | June 9, 1931 |
| 2,259,362 | Young | Oct. 14, 1941 |
| 2,335,190 | Minich | Nov. 23, 1943 |
| 2,168,331 | Fields et al. | Aug. 8, 1939 |
| 2,215,733 | Gibb et al. | Sept. 24, 1940 |
| 2,256,159 | Young | Sept. 16, 1941 |
| 1,814,641 | Smith et al. | July 14, 1931 |
| 1,951,853 | Walsh | Mar. 20, 1934 |
| 1,972,503 | Walker | Sept. 4, 1934 |
| 2,225,026 | Welsh | Dec. 17, 1940 |
| 2,372,177 | Conner | Mar. 27, 1945 |